United States Patent
Gamble et al.

(10) Patent No.: US 7,086,812 B2
(45) Date of Patent: Aug. 8, 2006

(54) CUTTING TOOL

(75) Inventors: Kevin M. Gamble, Stahlstown, PA (US); Thomas J. Long, II, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/423,328

(22) Filed: Apr. 25, 2003

(65) Prior Publication Data
US 2003/0202849 A1 Oct. 30, 2003

Related U.S. Application Data

(63) Continuation-in-part of application No. 10/134,328, filed on Apr. 29, 2002, now Pat. No. 6,702,526.

(51) Int. Cl.
*B23P 15/34* (2006.01)

(52) U.S. Cl. ............... 407/46; 407/37; 407/41

(58) Field of Classification Search ............... 407/36, 407/37, 38, 40, 44, 45, 46, 93; 408/153, 408/173

See application file for complete search history.

(56) References Cited

U.S. PATENT DOCUMENTS

| | | | |
|---|---|---|---|
| 1,050,455 A | | 1/1913 | Harrold |
| 1,190,197 A | | 7/1916 | Shimer |
| 1,728,264 A | | 9/1929 | England |
| 2,021,188 A | | 11/1935 | Lovejoy |
| 2,325,746 A | * | 8/1943 | Curtis ............... 407/32 |
| 3,343,431 A | | 9/1967 | Boyer |
| 3,802,043 A | | 4/1974 | Garih |
| 3,854,511 A | | 12/1974 | Maier |
| 4,309,132 A | | 1/1982 | Adamson et al. |
| 4,364,290 A | | 12/1982 | Astle |
| 4,449,556 A | | 5/1984 | Colton |
| 4,519,731 A | * | 5/1985 | Jester et al. ............... 407/46 |
| 4,547,100 A | | 10/1985 | Naccarato et al. |
| 4,566,826 A | * | 1/1986 | Dickinson ............... 407/37 |
| 4,621,957 A | | 11/1986 | Dillard et al. |

(Continued)

OTHER PUBLICATIONS

International Search Report mailed Aug. 8, 2003 in Application No. PCT/US03/13034.

(Continued)

*Primary Examiner*—Boyer D. Ashley
*Assistant Examiner*—Dana Ross
(74) *Attorney, Agent, or Firm*—Larry R. Meenan

(57) ABSTRACT

The cutting tool includes a cutter body having at least one pocket therein adapted to receive a cutting insert cartridge assembly. The at least one pocket has a forward wall, a rearward wall and a bottom wall. The bottom wall extends between the forward wall and the rearward wall and is arranged at an angle greater than 90 degrees relative to the forward wall and is arranged at an angle less than 90 degrees relative to the rearward wall. The insert cartridge assembly includes a cartridge and a clamping wedge. The cartridge has a front surface, a rear surface and a bottom surface and an insert pocket for receiving the cutting insert. The bottom surface is shaped to correspond to the bottom wall of the pocket, and the rear surface is shaped to correspond to the rearward wall of the pocket. The clamping wedge is of a dove tail shape and includes a forward wedge surface and a rear wedge surface. The forward wedge surface is in abutment with the forward wall of the cartridge pocket and the rear wedge surface is in abutment with the front surface of the cartridge. The clamping wedge assists in preventing the cartridge from moving radially from the cartridge pocket.

14 Claims, 5 Drawing Sheets

U.S. PATENT DOCUMENTS

| | | |
|---|---|---|
| 4,790,693 A | 12/1988 | Koblesky |
| 4,927,301 A | 5/1990 | Reiterman |
| 4,936,717 A | 6/1990 | Bosek |
| 5,031,491 A | 7/1991 | Hofmann |
| 5,102,268 A | 4/1992 | Mitchell |
| 5,167,473 A | 12/1992 | Barnett |
| 5,244,318 A | 9/1993 | Arai et al. |
| 5,395,186 A | 3/1995 | Qvart |
| 5,529,439 A * | 6/1996 | Werner et al. .............. 407/39 |
| 5,658,101 A * | 8/1997 | Hammer .................... 407/37 |
| 5,667,343 A | 9/1997 | Hessman et al. |
| 5,716,167 A * | 2/1998 | Siddle et al. .............. 407/36 |
| 5,735,649 A | 4/1998 | Boscarino et al. |
| 5,788,426 A | 8/1998 | Daniels |
| 5,800,079 A | 9/1998 | Qvarth |
| 5,868,529 A | 2/1999 | Rothballer et al. |
| 5,957,628 A | 9/1999 | Bentjens et al. |
| 5,975,811 A | 11/1999 | Briese |
| 6,004,080 A | 12/1999 | Qvarth et al. |
| 6,086,290 A | 7/2000 | Qvarth et al. |
| 6,176,648 B1 | 1/2001 | Mizutani |
| 6,224,299 B1 | 5/2001 | Frecska et al. |
| 6,280,122 B1 | 8/2001 | Qvarth |
| 6,334,740 B1 * | 1/2002 | Qvarth .................... 407/36 |
| 6,354,772 B1 | 3/2002 | Mueller |

OTHER PUBLICATIONS

Kennametal, Graphic of CNHU Milling Cutter.

* cited by examiner

US 7,086,812 B2

CUTTING TOOL

CROSS REFERENCE TO RELATED APPLICATION

This application is a continuation-in-part of U.S. patent application Ser. No. 10/134,328 filed Apr. 29, 2002 now U.S. Pat. No. 6,702,526 entitled Cutting Tool, incorporated herein by reference.

BACKGROUND OF THE INVENTION

1. Field of the Invention

This invention generally relates to a cutting tool. More particularly, this invention relates to a rotary milling cutter or slotting cutter having a cartridge assembly for holding a cutting insert for removing material from a workpiece.

2. Description of the Related Art

A milling cutter is a rotary cutting tool having a cutter body with one or more circumferentially spaced recesses known as "pockets", into which are mounted cutting inserts. The cutting inserts intermittently engage a workpiece to remove material from the workpiece. Each insert is secured into its respective pocket by means of a clamping screw, which extends through a centrally located hole in the insert. While pockets and clamping screws provide a secure mount for the inserts during a cutting operation, they do not, unfortunately, provide a system operator with a suitable means for adjusting the relative position of the cutting edges of the inserts mounted in the pockets. For a more detailed description of a milling cutter reference is made to U.S. Pat. No. 5,102,268, incorporated herein by reference.

SUMMARY OF THE INVENTION

This invention is directed to a cutting tool including a cutter body having at least one pocket therein. The pocket is adapted to receive a cutting insert cartridge for retaining a cutting insert. The cartridge is shaped to be securely retained within the pocket. In a preferred embodiment, the cutting tool includes a cutter body having at least one pocket therein adapted to receive a cutting insert cartridge assembly. The at least one pocket has a forward wall, a rearward wall and a bottom wall. The bottom wall extends between the forward wall and the rearward wall and is arranged at an angle greater than 90 degrees relative to the forward wall and is arranged at an angle less than 90 degrees relative to the rearward wall. The insert cartridge assembly includes a cartridge and a clamping wedge. The cartridge has a front surface, a rear surface and a bottom surface and an insert pocket for receiving the cutting insert. The bottom surface is shaped to correspond to the bottom wall of the pocket, and the rear surface is shaped to correspond to the rearward wall of the pocket. The clamping wedge is of a dove tail shape and includes a forward wedge surface and a rear wedge surface. The forward wedge surface is in abutment with the forward wall of the cartridge pocket and the rear wedge surface is in abutment with the front surface of the cartridge. The clamping wedge assists in preventing the cartridge from moving radially from the cartridge pocket.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Figure 1:
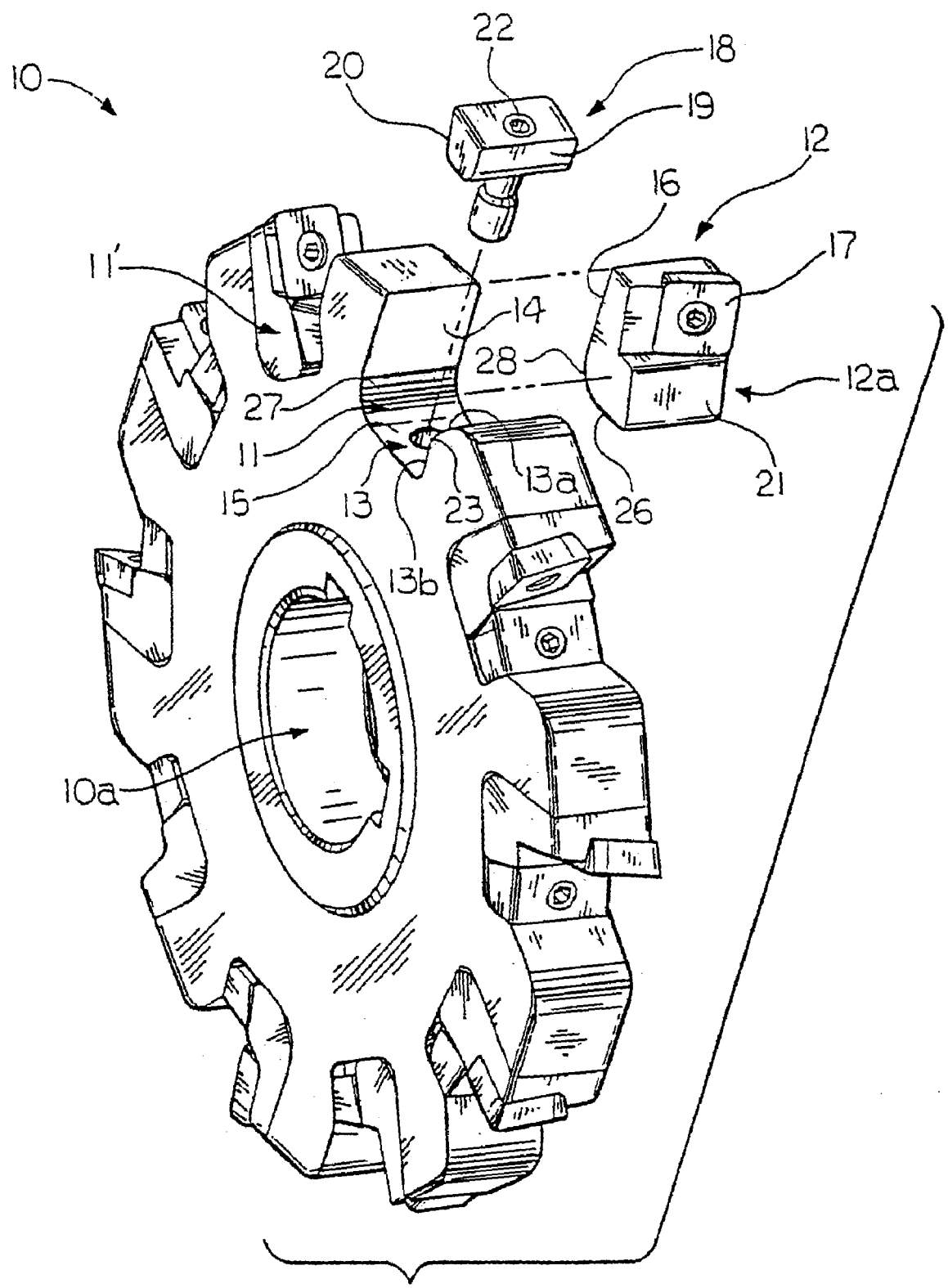
FIG. 1 is a partially exploded front perspective view of a cutting tool that includes insert cartridge assembly.
Figure 2:
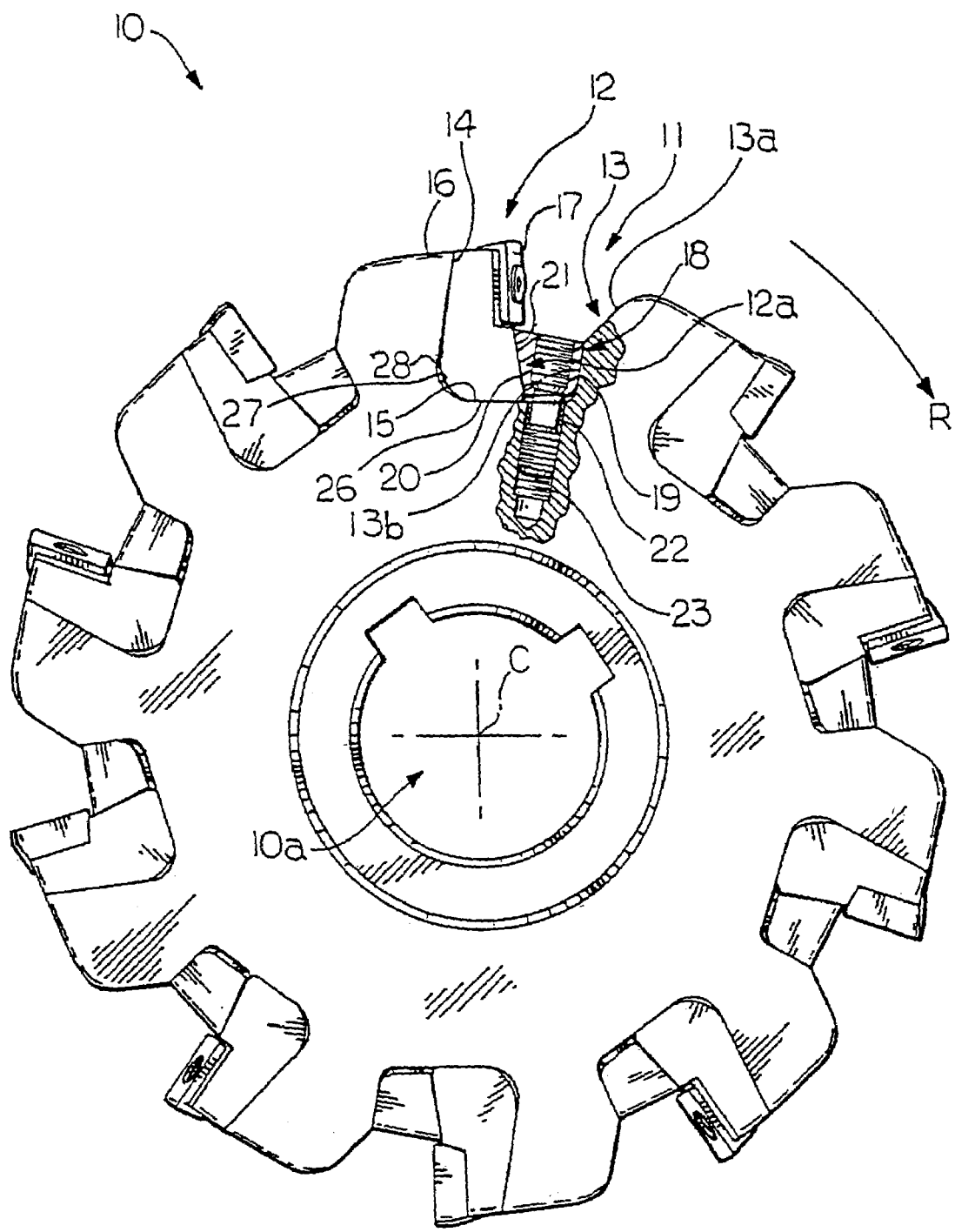
FIG. 2 is a partial cutaway side elevational view of the cutting tool illustrated in FIG. 1 with some insert cartridge adjusting devices and wedge screws shown in full.
Figure 3:
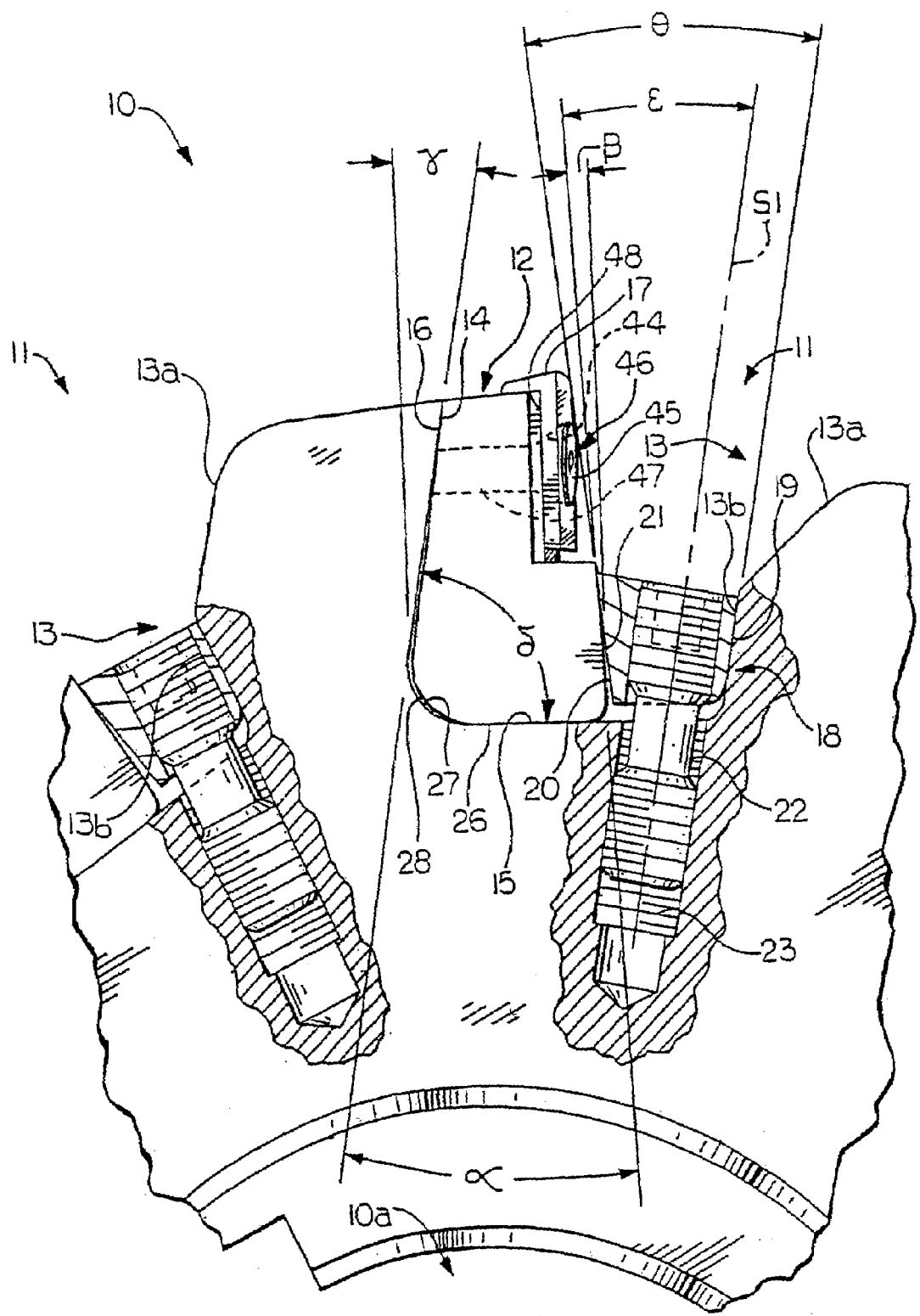
FIG. 3 is an enlarged partial cutaway side elevational view of the cutting tool illustrated in FIGS. 1 and 2.

With reference now to FIGS. 1–3, wherein like numerals designate like components throughout all of the several figures, a cutter body of a rotary milling cutter or slotter is denoted by reference numeral 10. The milling cutter body 10 is arranged for rotation around the central axis C in direction R (i.e., in a clockwise direction when viewing FIG. 2). The milling cutter body 10 has a central core portion 10a and a plurality of circumferentially spaced, radially outwardly open recesses or cartridge pockets 11 located in an outer periphery of the body 10. The cartridge pockets 11 are provided for the receipt of cartridge assemblies including partially wedge-shaped cartridges 12 (i.e., insert cartridges) and clamping wedges 18 more fully described below.

The cartridge pockets 11 are evenly distributed along the periphery of the cutter body 10. In the embodiment shown, ten cartridge pockets 11 are provided. It is to be understood, however, that the cartridge pockets 11 in certain cases can be unevenly distributed around the periphery of the milling cutter body. Moreover, a greater or lesser number of cartridge pockets 11 can be provided.

A leading or forward wall 13 of each cartridge pocket 11, as seen in the rotary direction R, comprises two surfaces 13a and 13b. The surfaces 13a and 13b may be arranged at an angle relative to each other or the surfaces 13a and 13b may be coplanar. A trailing or rearward wall 14 of the cartridge pocket 11 has a generally flat surface. A bottom of the cartridge pocket 11 is defined by a bottom wall 15, which extends between the forward and rearward walls 13 and 14. The rearward wall 14 of the cartridge pocket 11 is adapted to engage a rear surface 16 of the cartridge 12. The bottom wall 15 of the cartridge pocket 11 is arranged at an angle greater than 90 degrees relative to a radially inner surface 13b of the forward wall 13 of the cartridge pocket 11. The bottom wall 15 is oriented at an angle δ (shown in FIG. 3) less than 90 degrees relative to the rear wall 14 of the same cartridge pocket 11.

The wedge shaped cartridges 12 are of a width (i.e., the dimension parallel to a central axis C (shown in FIG. 2) of rotation of the body 10) in one embodiment, less than the width of the milling cutter body 10 or, in a preferred embodiment equivalent to the entire width of the milling cutter body 10. A radially inner wedge-shaped portion of the cartridge is denoted by numeral 12a (shown in FIG. 2).

The cartridge assembly includes a clamping means for the cartridge 12 in the form of a clamping wedge 18 arranged radially inward of a cutting edge of an insert 17 when the insert is seated on the cartridge 12. A leading or forward wedge surface 19 of the wedge 18 (with reference to the rotary direction R) is arranged in abutment with the radially inner surface 13b of the forward wall 13 of the cartridge pocket 11. A trailing or rear wedge surface 20 of the wedge 18 is arranged in abutment with a leading or front surface 21 of the cartridge 12. The wedge 18 is displaced along the surface 13b of the forward wall 13 of the cartridge pocket 11 upon tightening a fastener such as a threaded clamp screw 22. The screw 22 is threadably engaged in a corresponding threaded bore 23 in the cartridge pocket 11. The bore 23 can extend all the way through to the core portion 10a of the cutter body 10. The clamp screw 22 is provided with right hand threads along the bottom of the screw and left hand threads along the top of the screw so that the clamp wedge 18 can be positively displaced in both the clamping and unclamping directions (i.e., in opposing radial directions when viewing FIG. 1) as the clamp screw is threaded or unthreaded within the block. Loosening of the cartridge 12 is accomplished by an unscrewing of the clamp screw 22.

The bottom surface 26 of the cartridge 12 is shaped to correspond with the bottom wall 15 of the cartridge pocket 11. When the cartridge 12 is installed in the cartridge pocket 11, the bottom wall 15 of the cartridge pocket 11 engages the bottom surface 26 of the cartridge 12. In a preferred embodiment, in order to reduce stress sustained by the cutter body 10 during rotation of the cutter body and the cutting process, the rearward and bottom walls 14 and 15 of the cartridge pocket 11 and the rear and bottom surfaces 16 and 26 of the cartridge 12 intersect at rounded corners 27 and 28. The radii of the corners 27 and 28 are limited by seating surface 26 of the cartridge and bottom wall 15 of the pocket.

A radially outer portion of the cartridge 12 should, in a conventional manner, be provided with a seat or insert pocket for the location of the cutting insert 17. As shown in FIG. 3, the insert 17 is in this case provided with a central aperture 44 for the receipt of the conical head 45 of a centrally provided clamp screw 46 which is threadably engaged in a correspondingly threaded bore 47 in the cartridge 12. The central aperture 44 of the insert 17 has a decreasing cross-section towards a bottom surface 48 of the insert 17. The head of the clamp screw 46 should be pre-loaded, in a conventional manner, to locate the insert 17 in the insert pocket when tightening the clamp screw 46.

The cartridges 12 could, at different positions around the milling cutter body 10, be provided with inserts 17 located in different orientations, such as shown in FIGS. 1–3. It should be appreciated by one skilled in art that based upon the foregoing, the inserts 17 could be located in orientations different than those illustrated. It should further be appreciated that the inserts 17 could also be indexable (i.e., the inserts 17 could be rotated and/or flipped over to expose different cutting edges). One common feature of all these cartridges 12 is that the insert 17 has a central aperture 44 for the receipt of a clamp screw 46 engaging therein. It will be appreciated that the insert and cartridge may be formed as a unitary construction.

Figure 4:
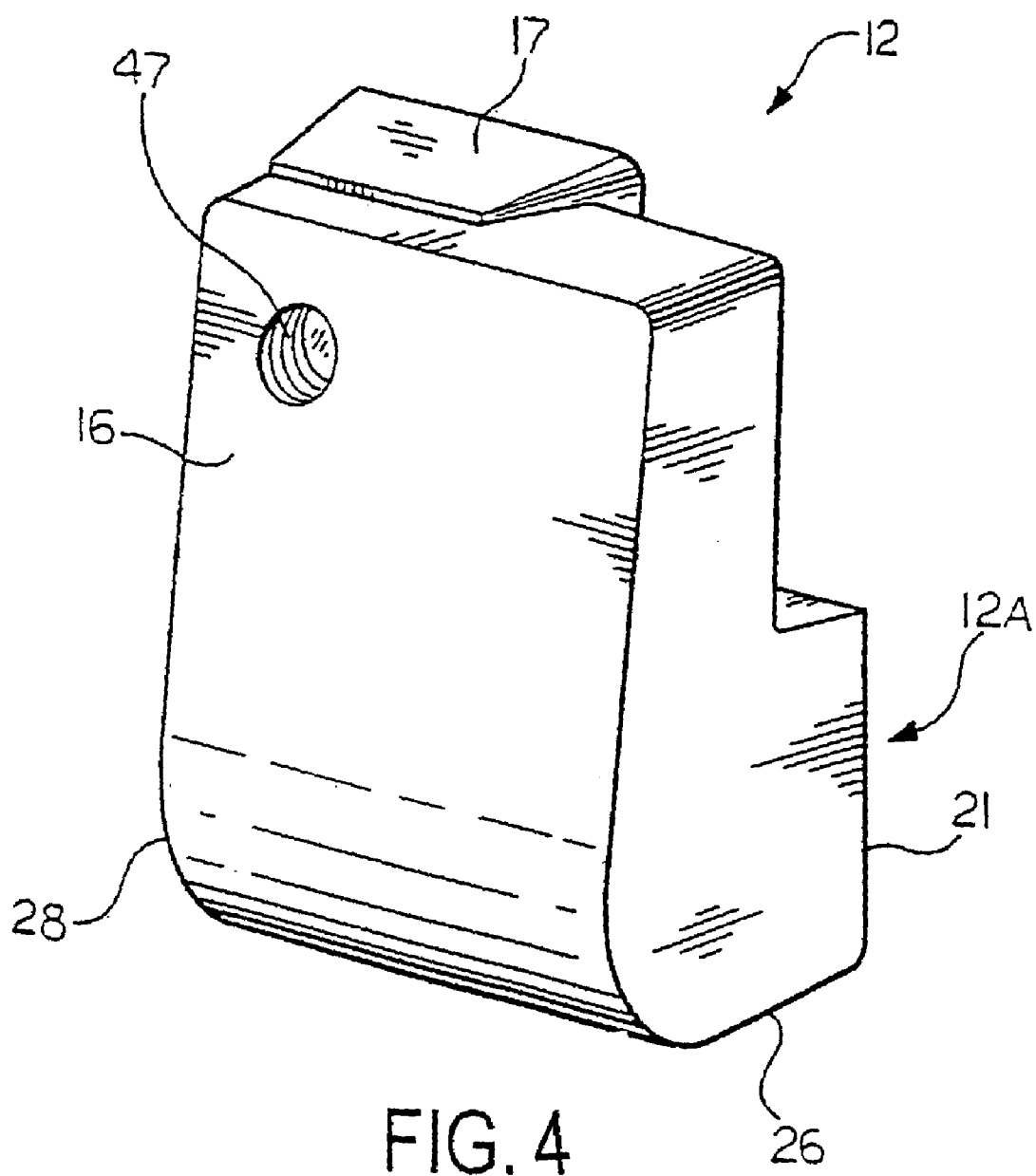
FIG. 4 is an enlarged rear perspective view of the insert cartridge illustrated in FIGS. 1–3.

As shown in FIGS. 3 and 4, the wedge-shaped portion 12a of the cartridge 12 is provided with a cartridge angle α that is the sum of the angles of the front and rear surfaces 21 and 16 of the cartridge 12. For example, the front surface 21 of the cartridge 12 may be provided with an angle β in the range of 0 degrees to 20 degrees, and preferably about 4 degrees. The rear surface 16 of the cartridge 12 may be provided with an angle γ in the range of 5 degrees to 45 degrees, and preferably about 9 degrees. The resultant cartridge angle α is in the range of 5 degrees to 65 degrees, and preferably about 13 degrees. The resultant shape of the wedge-shaped portion 12a is that of a dovetail, which helps prevent the cartridge 12 from escaping radially from the cartridge pocket 11.

Note that the angle δ between the rearward wall 14 and the bottom wall 15 of the cartridge pocket 11 is an acute angle. The angle δ is in the range of 45 degrees to 89 degrees, and preferably about 80 degrees. This is to insure that the cartridge 12 will also be driven radially inward and rearward into the cartridge pocket 11.

A gap should be provided between the cartridge 12 and cutter body pocket 11 near a radially inward portion of the rear surface 16 of the cartridge 12. If the angle γ of the rear surface 16 of the cartridge 12 is about 10 degrees and the angle δ of the rearward wall 14 of the cartridge pocket 11 is about 80 degrees relative to the bottom wall 15 of the cartridge pocket 11, a gap will be provided between the radially inward portion of the rear surface 16 of the cartridge 12 and cutter body pocket 11. The gap should be continued into the radii of the rounded corners 27 and 28 between the rearward and bottom walls 14 and 15 of the cartridge pocket 11 and the rear and bottom surfaces 26 of the cartridge 12. This could be accomplished if the radius of the corner 27 between the rearward and bottom walls 14 and 15 of the cartridge pocket 11 is smaller than the radius 28 between the rear and bottom surfaces 16 and 26 of the cartridge 12. This gap is to assure that the radially outward portion of surface 16 of the cartridge 12 always makes contact with the radially outward portion of surface 14 of the cartridge pocket 11.

Continuing with FIG. 3, there is illustrated a gap between the front surface 21 of the cartridge 12 and a radially inward portion of the rear wedge surface 20. This insures that a radially outward portion of the clamping wedge 18 engages the front surface 21 of the cartridge 12 to drive the cartridge 12 radially inward and rearward into the cartridge pocket 11. To this end, the central axis $S_1$ of the clamp screw 22 should not be radially oriented in relation to the central axis C of rotation of the cutter body 10. The central axis $S_1$ should be parallel to the plane of the forward wedge surface 19. The front surface 21 of the cartridge 12 forms an acute angle ε with the central axis $S_1$ and the plane of the forward wedge surface 19. The angle ε is in the range of 5 degrees to 65 degrees, and preferably about 14 degrees. As stated above, the resultant wedge angle θ is preferably about 15 degrees. The disparity in the two angles ε and θ provides a gap between the front surface 21 of the cartridge 12 and the radially inward portion of the rear wedge surface 20.

Figure 5:
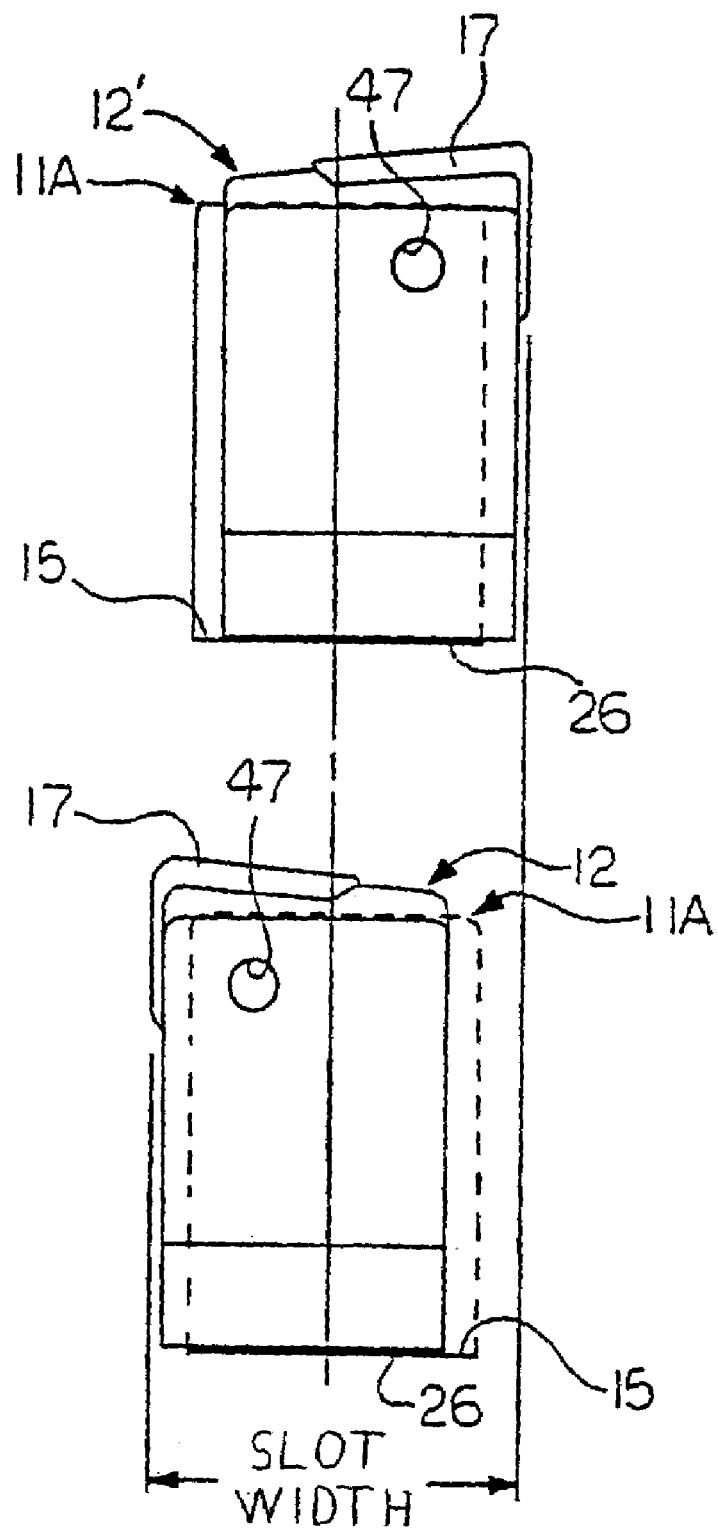
FIG. 5 is an enlarged diagrammatic representation of the adjusting device and succeeding right and left insert cartridges of the cutting tool illustrated in FIG. 1.

In operation, the clamp screw 22 of the clamping wedge 18 is loosened to loosen the clamping wedge 18 sufficiently to adjust the cartridge 12 in the cartridge pocket 11. With the clamping wedge 18 loosened. The cutter body 10 may support left-handed cartridges 12 (at the top when viewing FIG. 5) and right-handed cartridges 12 (at the bottom when viewing FIG. 5).

While this invention has been described with respect to several preferred embodiments, various modifications and additions will become apparent to persons of ordinary skill in the art. All such variations, modifications, and variations are intended to be encompassed within the scope of this patent, which is limited only by the claims appended hereto.

The documents, patents and patent applications referred to herein are hereby incorporated by reference.

What is claimed is:

1. A cutting tool comprising:
   a cutter body having at least one pocket therein adapted to receive a cutting insert cartridge assembly, the at least one pocket having a forward wall, a rearward wall and a bottom wall, the bottom wall extending between the forward wall and the rearward wall and being arranged at an angle greater than 90 degrees relative to the forward wall and being arranged at an angle less than 90 degrees relative to the rearward wall;

the insert cartridge assembly including a cartridge and a clamping wedge, the cartridge having a front surface, a rear surface and a bottom surface and an insert pocket for receiving the cutting insert, the bottom surface receiving the bottom wall of the pocket, and the rear surface receiving the rearward wall of the pocket;

the clamping wedge being of a dove tail shape and including a forward wedge surface and a rear wedge surface, the forward wedge surface being in abutment with the forward wall of the cartridge pocket and the rear wedge surface being in abutment with the front surface of the cartridge, wherein the clamping wedge assists in preventing the cartridge from moving radially from the cartridge pocket;

wherein a gap opening in a radially inward direction is formed between the front surface of the cartridge and a radially inward portion of the rear wedge surface.

2. The cutting tool of claim 1, wherein the cartridges are of a width less than a width of the cutter body.

3. The cutting tool of claim 2, wherein the cartridges are equivalent to the cutter body width.

4. The cutting tool of claim 1 wherein the pocket includes a threaded bore for receiving a fastener wherein the fastener is in communication with the wedge whereby the wedge may be moved along the forward wall of the cartridge pocket between a clamped position and an unclamped position by rotation of the fastener.

5. The cutting tool of claim 4, wherein the cartridge includes a cartridge angle $\alpha$ as defined by an angle formed between the front surface of the cartridge and the rear surface of the cartridge.

6. The cutting tool of claim 5, wherein an angle $\beta$ in the range of 0 degrees to 20 degrees is defined between the front surface of the cartridge and a line perpendicular to the bottom wall of the pocket.

7. The cutting tool of claim 5, wherein an angle $\gamma$ in the range of 5 degrees to 45 degrees is defined between the rear surface of the cartridge and a line perpendicular to the bottom wall of the pocket.

8. The cutting tool of claim 5, wherein the resultant cartridge angle $\alpha$ is in the range of 5 degrees to 65 degrees.

9. The cutting tool of claim 1, wherein the rearward wall and the bottom wall of the cartridge pocket form an acute angle $\delta$.

10. The cutting tool of claim 9, wherein the angle $\delta$ is in the range of 45 degrees to 89 degrees.

11. The cutting tool of claim 10, wherein a central axis $S_1$ of the fastener is not radially oriented in relation to a central axis C of the cutter body.

12. The cutting tool of claim 11, wherein the central axis $S_1$ is parallel to a plane formed by the forward wedge surface.

13. The cutting tool of claim 12, wherein an acute angle $\epsilon$ is formed between the front surface of the cartridge and the central axis $S_1$.

14. The cutting tool of claim 13, wherein the angle $\epsilon$ is in the range of 5 degrees to 65 degrees.

* * * * *